United States Patent

Welch

[11] Patent Number: 5,906,538
[45] Date of Patent: May 25, 1999

[54] CUTTING APPARATUS WITH ABRASIVE WHEEL

[76] Inventor: Richard Joseph Welch, 465 Penguin Dr., Satellite Beach, Fla. 32937

[21] Appl. No.: 08/846,261

[22] Filed: Apr. 30, 1997

[51] Int. Cl.⁶ ................................................ B24B 27/08
[52] U.S. Cl. .......................................... 451/241; 451/178
[58] Field of Search ................................. 451/178, 182, 451/213, 241, 224, 260, 282, 377, 273; 125/13.01, 35

[56] References Cited

U.S. PATENT DOCUMENTS

| | | | |
|---|---|---|---|
| 1,786,139 | 12/1930 | Taggart | 451/213 |
| 2,491,047 | 12/1949 | Hunt et al. | 451/182 |
| 2,557,251 | 6/1951 | Baker et al. | 125/13.01 |
| 2,895,513 | 7/1959 | Cowley | 143/52 |
| 2,922,263 | 1/1960 | Bogert, Sr. | 451/377 |
| 4,077,290 | 3/1978 | Hreha | 83/471.2 |
| 4,292,870 | 10/1981 | Mericle | 83/471.2 |
| 5,325,752 | 7/1994 | Bory | 83/468.4 |

*Primary Examiner*—Robert A. Rose
*Attorney, Agent, or Firm*—Robert L. Wolter; Holland & Knight LLP

[57] ABSTRACT

A cutting apparatus which cuts, shaves, splits and the like small work pieces, such as metal or plastic articles at desired angles and/or along straight lines. The cutting apparatus includes a motor unit with an abrasive wheel mounted on a portable planar member. A plurality of guide rails are attached to the planar member forming a plurality of track surfaces on the planar member. A first platform engages the guide rails and is interchangeable amount three positions with respect to the abrasive wheel. A second platform is detachably secured to the first platform. A vice means is secured on the first platform or second platform for holding a work piece to be cut and multiple platforms which secure and adjust the position of the work piece being cut.

13 Claims, 4 Drawing Sheets

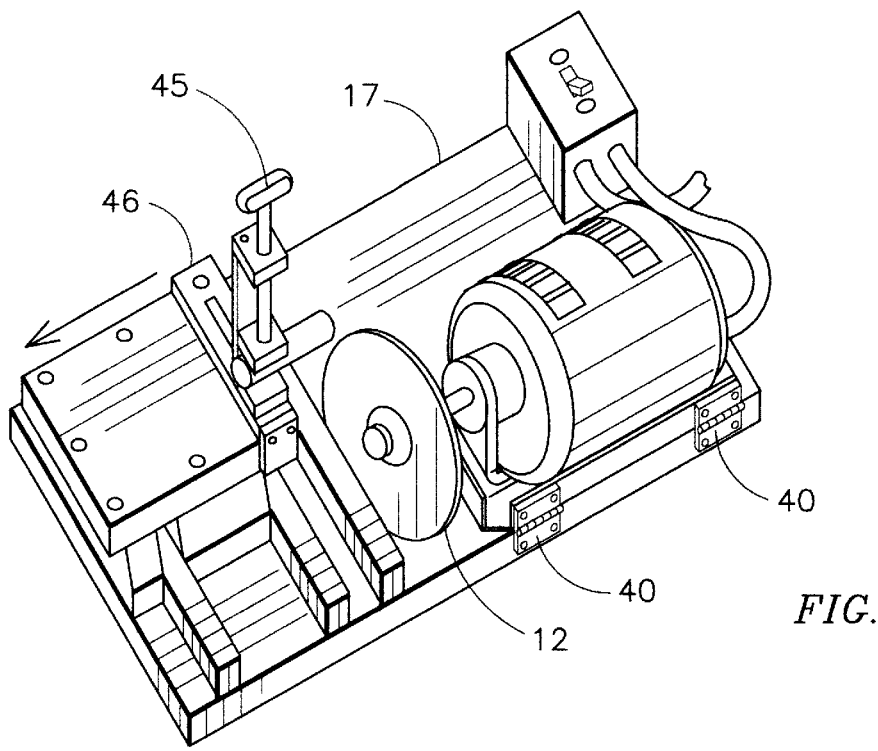
FIG. 9
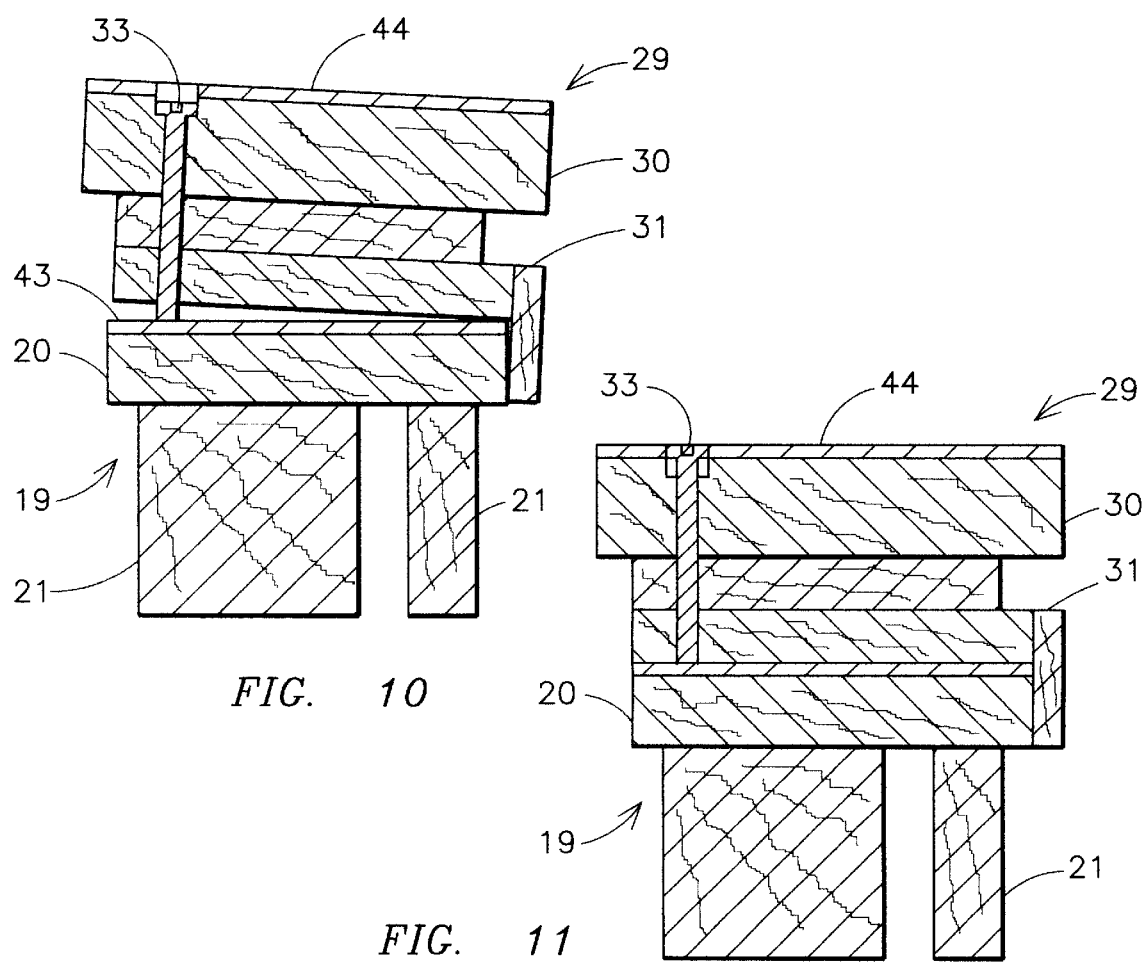
FIG. 10
FIG. 11

CUTTING APPARATUS WITH ABRASIVE WHEEL

FIELD OF THE INVENTION

This invention relates generally to cutting machines, and more specifically, to a cutting tool for precision straight and angled cutting of workpieces such as, metals, plastics, ceramics and electrical conduit.

BACKGROUND

In many professional activities, or hobbies, involving carpentry or plumbing, there often exists a need to precisely cut, shave and split small work pieces to a desired length or angle. It is desirable to have an easy-to-use cutting instrument, which insures precision, can be transported and has a minimal number of mechanical parts to facilitate low maintenance. The present invention meets these needs and provides a cutting apparatus with height and angle adjustment capability and insures that a workpiece can be cut along a true line.

A cutting device has been utilized to cut along a work piece is illustrated in U.S. Pat. No. 2,895,513 for a "Work holder," which discloses a device having a cutter and a table provide with a miter slot. The '513 patent discloses a base plate which slides on the table and a guide portion is on its underside which extends into the miter slot.

SUMMARY OF THE INVENTION

It is an object of this present invention to provide a cutting apparatus to cut, shave and split small work pieces, such as metal or plastic articles and to align these work pieces in relation to an abrasive wheel so that the work piece can be precisely cut along an angle or straight line.

Another object of this invention is to provide a cutting apparatus or apparatus which allows height and angle adjustment of a work piece in relation to an abrasive wheel.

Still another object of this invention is to provide a cutting apparatus which uses multiple platforms to secure and adjust the position of work pieces in relation to an abrasive blade.

Yet another object of this invention is to use guide rails to enhance control and cutting precision.

The foregoing objectives are achieved by the present invention which includes a motor unit having an abrasive wheel for cutting plastic and metal work pieces. The motor unit is mounted to a portable planar member. Three guide rails are mounted to the planar member, parallel the abrasive wheel, intermediate the abrasive wheel and an edge of the planar member. The work piece is secured to a first platform which engages the guide rails and is interchangeable between three positions on the planar member with respect to the abrasive wheel. A second platform is mountable onto the first platform to adjust the height of the work piece with respect to the abrasive wheel. The cutting unit also includes a means for adjustment of the angle of the top surface of the second platform with respect to the abrasive wheel.

Two stops are mounted on the planar member. A first stop is mounted between the first and second guide rails, and a second stop is adjacent the motor unit.

The height of the abrasive wheel is also adjustable. The motor unit is mounted on a plate which is hingedly mounted to the planar member. The plate is selectively, vertically and adjustable which adjusts the height of the abrasive wheel.

It is therefore proposed that these and other objectives will become more apparent to those persons skilled in the art upon consideration of the ensuing description and drawings.

BRIEF DESCRIPTION OF THE DRAWINGS

FIG. 9 is a perspective view of the metal cutting apparatus with a vice attachment on the first platform.

FIG. 10 is a side cross-sectional view of the second platform attached to the first platform.

FIG. 11 is a side cross-sectional view of the first platform and second platform attached without height displacement.

DETAILED DESCRIPTION OF THE DRAWINGS

Figure 1:
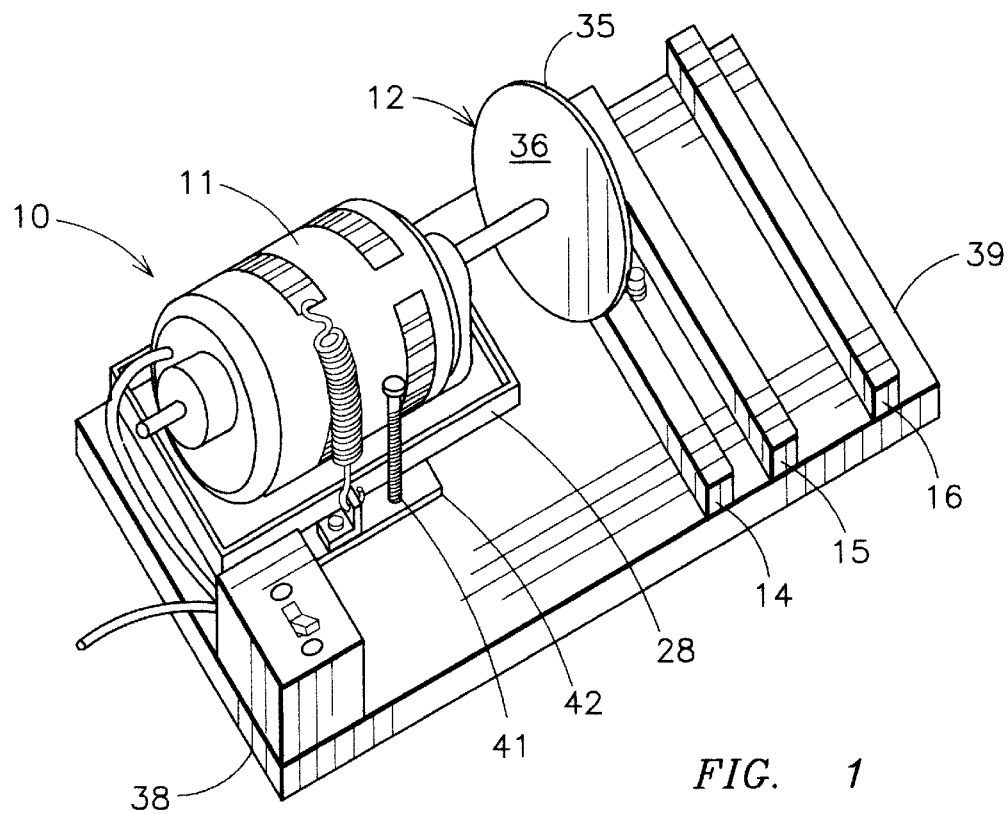
FIG. 1 is a perspective view of the cutting apparatus.

The invention for a cutting apparatus 10 for cutting a work piece 24 is shown in FIG. 1. The cutting apparatus 10 is for cutting, shaving, splitting or the like of small work pieces as plastic or metal pieces. The cutting apparatus 10 includes a motor unit 11 mounted onto a top surface 18 of a portable planar member 17. The motor unit 11 is mounted on the planar member 17 between a first end 38 and a second end 39 of the planar member 17.

An arbor 13 connects an abrasive wheel 12 to the motor unit 11 to drive the abrasive wheel 12. The abrasive wheel 12 extends in a substantially vertical plane perpendicular to a longitudinal axis of the arbor 13 and motor unit 11. The abrasive wheel 12 includes a first wheel surface 36 facing the motor unit and a second wheel surface 37, parallel to the first wheel surface 36, and facing the second end 39 of the planar member 17. A cutting edge 35 is integral the first surface 36 and second surface 37 of the abrasive wheel 12, and extends in the plane of the abrasive wheel 12 perpendicular to the longitudinal axis of motor unit 11.

Figure 2:
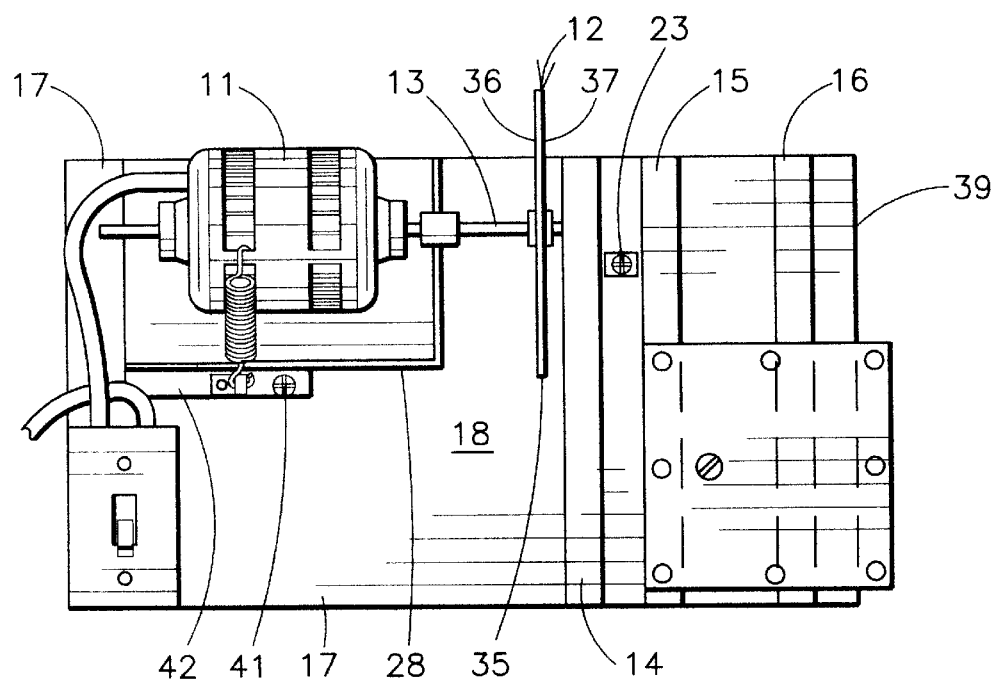
FIG. 2 is a top view of the cutting apparatus, with a first platform.

As shown in FIGS. 1 and 2, a plurality of guide rails 14, 15 and 16 are mounted on the top surface 18 of the planar member 17, between the abrasive wheel 12 and the second end 39 of the planar member 17. The guide rails 14–16 extend parallel the abrasive wheel 12. A first guide rail 14 is adjacent to the abrasive wheel 12. The third guide rail 16 is positioned toward the second end 39 of the planar member 17. The second guide rail 15 is mounted to the planar member 17 between the first guide rail 14 and the third guide rail 16.

The guide rails 14, 15 and 16 are spaced apart to form a plurality of track surfaces 24–27 adjacent the guide rails 14, 15 and 16. As shown in FIGS. 2–5, a first platform 19 has a top portion 20 for supporting a work piece and a base portion 21 for engagement with the track surfaces 24–27 and guide rails 14, 15 and 16. The work piece rests on a horizontally disposed support surface 43 integral the top portion 20.

The bottom portion 21 has a first base 21A and a second bottom base 21B that are separated forming a channel 22. The first platform 19 is positioned over, and receives, one of the guide rails 14, 15 or 16 so the base portion 21 engages the track surfaces adjacent 24–27 the respective guide rail 14, 15 or 16.

Figures 3, 4, 5:
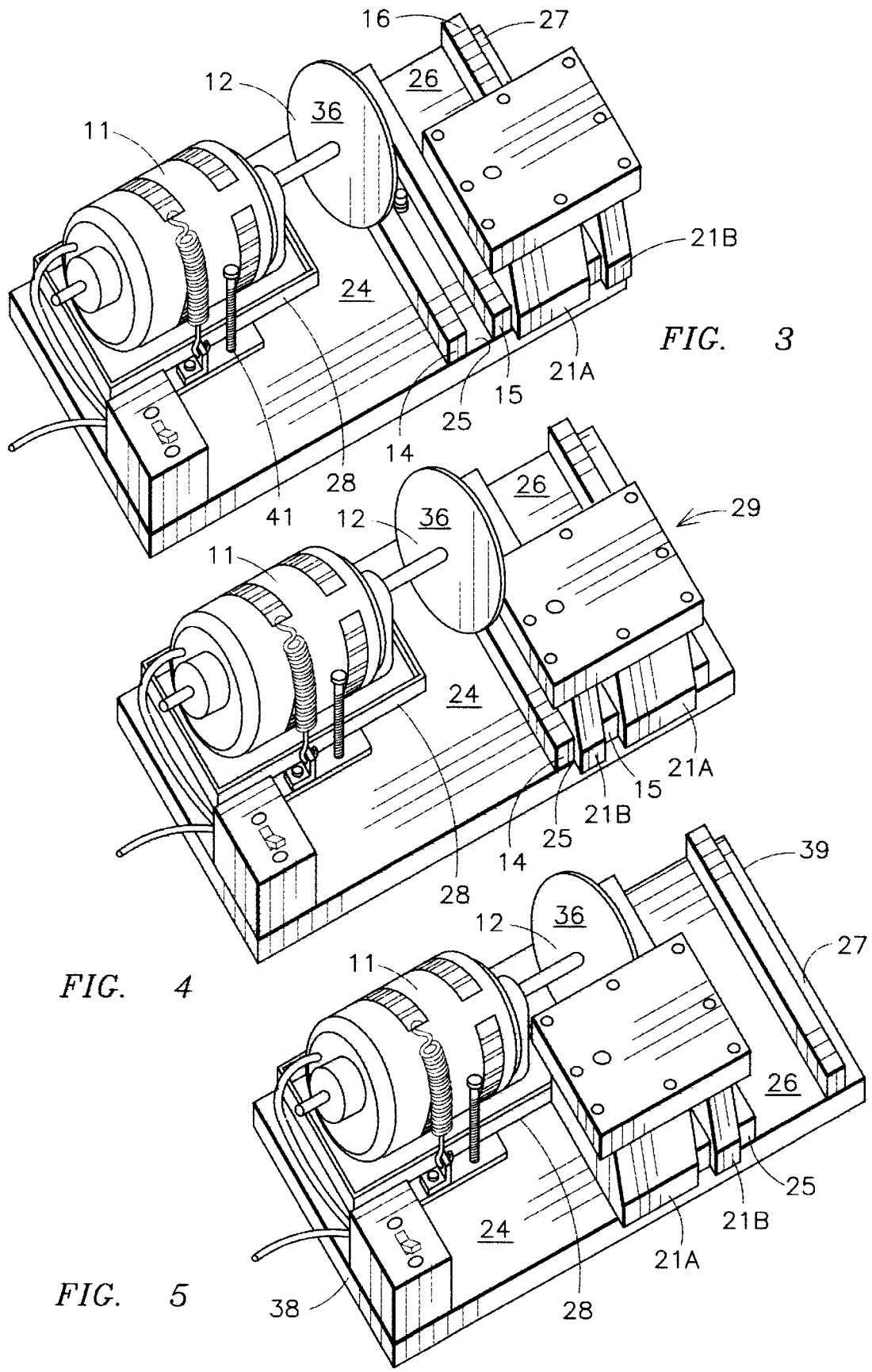
FIG. 3 is a perspective view of a cutting apparatus with the first platform engaging a third guide rail.
FIG. 4 is a perspective view of the cutting apparatus and a first platform engaging a second guide rail.
FIG. 5 is a perspective view of the cutting apparatus with the first platform engaging a first guide rail.

With respect to FIGS. 3 through 5, the first platform 19 is shown in three interchangeable positions with respect to the abrasive wheel 12. FIG. 3 shows the first platform 19 on the planar member 17 in a first position. The platform 19 and channel 22 engage or receive the third guide rail 16 so the base 21A engages track surface 26 and the base 21B engages track surface 27. A user may utilize this first position to make deep cuts in the work piece 32, or to cut entirely through a work piece 32.

FIG. 4 illustrates the first platform 19 in a second position with a top portion 20 of the first platform 19 adjacent the abrasive wheel 12. The channel 22 receives the second guide rail 15. The base 21A engages track surface 26 and base 21B engages track surface 25.

As shown in FIGS. 1–3, a stop 23 is mounted on the track surface 25. When the platform 19 is placed on the track surfaces 25 and 26 on planar member 26, and over the guide rail 15, a user forces the platform 19 along the planar member 19. The guide rails 14–16 direct the platform, along the track surface 24–27, and also the work piece, along a true line for cutting. The stop 23 engages to platform section 21B, halting movement of the platform 19 to create a cut the length of the distance from the cutting edge 35 of the abrasive wheel 12 to the stop 23.

FIG. 5 illustrates the first platform 19 in a third position in front of the abrasive wheel. The first two positions have the platform 19 positioned lateral of the abrasive wheel 12 between the abrasive wheel and the second edge and the platform 19. The channel 22 in the base portion 21 of the first platform 19 is positioned over and engages the first guide rail 14. The base 21A engages the track surface 24 and the base 21B engages track surface 25. A second stop 28 is mounted on the track surface 24 to prevent the first platform 24 from movement along the first guide rail beyond the position of the stop 28. The stop 28 is attached to a mounting plate 29 upon which the motor unit 11 rests.

This third position of the first platform 19 facilitates cuts in a work piece that may not extend through the work piece. This position also facilitates shaving a work piece. In any one of the positions a small piece of sheet metal may be placed flat on the support surface of the first platform 19 and a user may "freehand" a cut in the work piece by sliding it along the top portion 20 of the platform 19. This invention is designed to be used for cutting smaller work pieces. The planar member is about 19¼ inches from the first end 38 to the second end 39. The top portion 20 of the platform 19 is a six inch square and is approximately 3½ inches in height.

A work piece may also be secured to the first platform (or the second platform 30 referred to below) by a vice means 45 shown in FIG. 9. The vice means includes a vice 45 secured to the top portion 20 of the first platform 19. The vice 43 is slidable along the top portion of the platform in two directions. The vice is mounted on a run 46. The vice 45 is slidable along the run 43 parallel the surface 36 and 37 of the abrasive wheel 12. In addition, the run 43 is slidable on the top portion 20 of the first platform 19 in a direction perpendicular to the guide rails 14–16.

Figure 6:
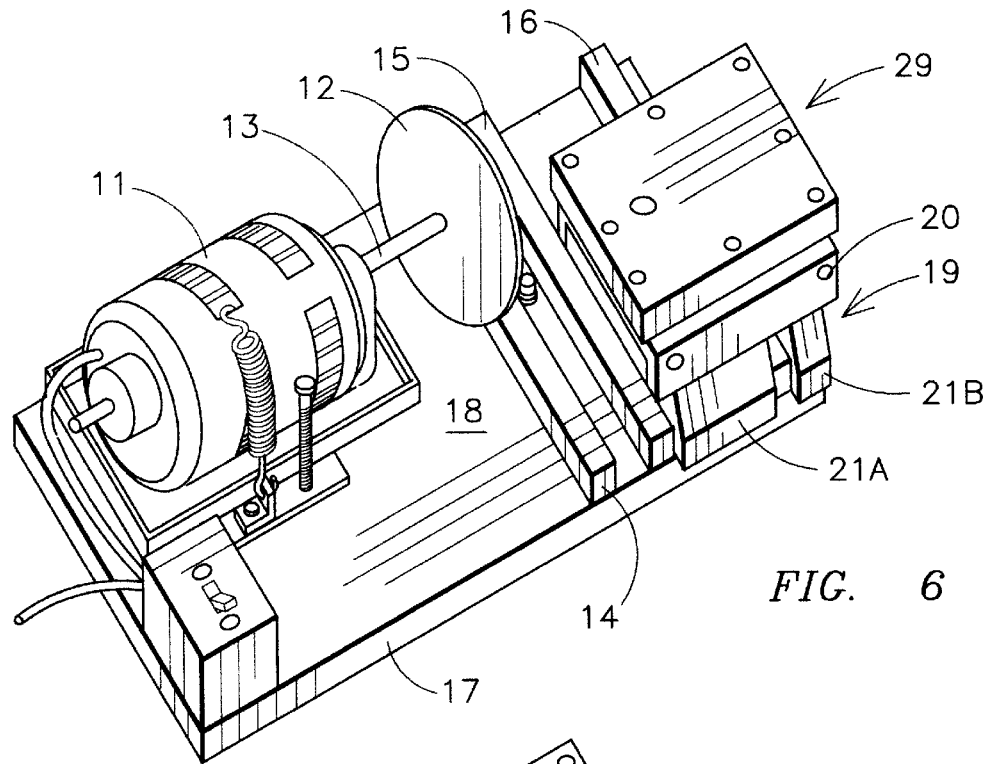
FIG. 6 is a perspective view of the cutting apparatus with the second platform mounted to the first platform.
Figure 7:
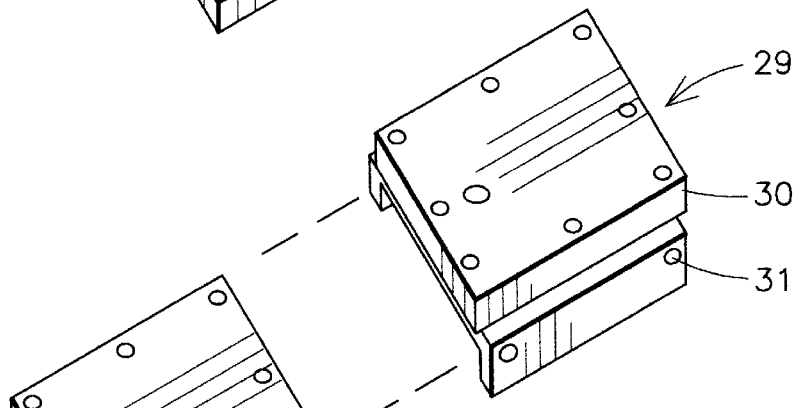
FIG. 7 is an expanded perspective view of the second platform and the first platform.
Figure 8:
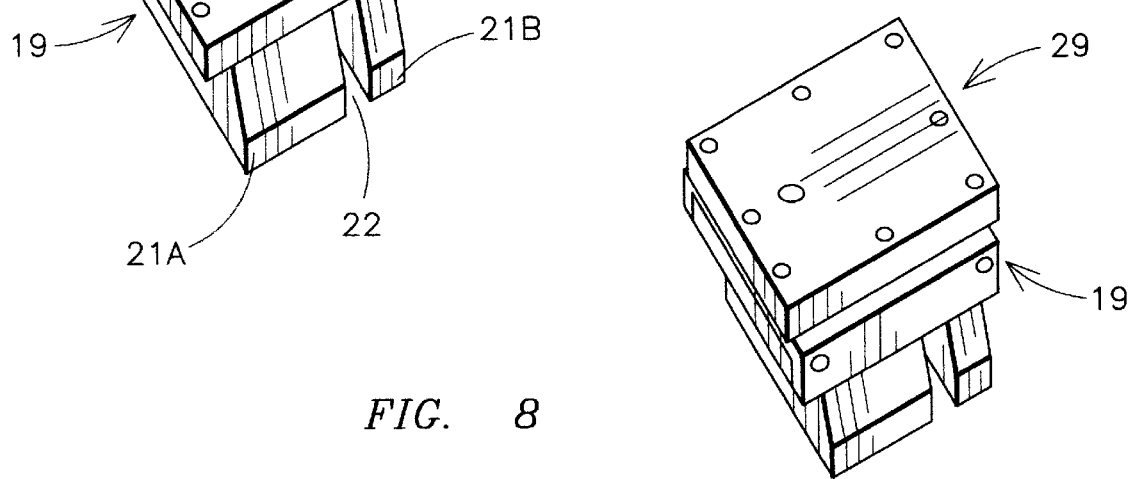
FIG. 8 is a perspective view of the first platform and second platforms attached.

The cutting apparatus 10 also includes a means for adjusting the height of the platform 19, or for adjusting the vertical position of the work piece 32, with relation to the abrasive wheel 12. With reference to FIGS. 6, 7, and 8, the cutting apparatus 10 includes a second platform 29 which can be attached to the top portion 20 of the first platform 19.

The second platform 29 has a top portion 30 for supporting a work piece 32 and a bottom portion 31 for attachment to the top portion 20 of the first platform 19.

As illustrated in FIGS. 10 & 11, the second platform 29 can be attached to the top portion 20 of the first platform 19. The second platform 29 includes a top portion 30 and a lower pocket 31. As shown in FIG. 7 and FIG. 8, the lower pocket 31 is U-shaped providing opening within which top portion 20 of the first platform 19 fits. The second platform 29 may be used so a work piece 32 will engage the cutting edge 35 of the abrasive wheel 12 at a different point so the edge 35 may wear more evenly.

FIG. 11 illustrates the second platform 30 on the first platform 19 without vertical displacement between the first platform 19 and the second platform 29. In FIG. 10, the bolt 33 is adjusted (or rotated) and the top portion 30 of the second platform 29 is displaced at an angle above horizontal. When a work piece is cut at such an angle, this adjustment places an angled edge or surface on the work piece 32.

In addition to the height adjustment of the work piece 32, the invention also includes means for selective adjustment of the height of the abrasive wheel 12. As noted above, the motor unit is mounted to a mounting plate 34, which is attached to the planar member 17 by hinges 40. A bolt 41 extends through a lift 42 which extends underneath the mounting plate 34. As the bolt 41 is rotated clockwise, the lift 42 rises upwardly, along the bolt 41, and elevates the mounting plate 34, and selectively elevating the abrasive wheel 12 to a desired height. Similar to the height adjustment of the work piece by the addition of the second platform 29, the lift 42 (height adjustment means) allows for alternate contact points with the abrasive wheel 12 for a more even wear of the abrasive wheel 12.

While I have disclosed the preferred embodiment of my invention, it is not intended that this description in any way limits the invention, but rather this invention should be limited only by a reasonable interpretation of the new recited claims.

Having thus described my invention, what I claim as new and desire to secure by Letters Patent is:

1. A cutting apparatus for cutting a work piece, comprising:

a. a planar member having a top surface, a first edge and a second edge;

b. a cutting unit mounted on the top surface of the planar member with said cutting unit having an abrasive wheel, activated by a motor, said abrasive wheel having a cutting edge extending in a plane perpendicular to a longitudinal axis of the cutting unit and said abrasive wheel having a first wheel surface facing the motor unit and a second wheel surface facing the second edge of the planar member;

c. a plurality of guide rails mounted on the top surface of the planar member between said abrasive wheel and the second edge of the cutting unit, and spaced apart forming a plurality of track surfaces on the planar member, and said guide rails aligned in parallel relationship to the cutting edge of the abrasive wheel;

d. a first platform having a top portion and a horizontally disposed support surface integral the top portion for supporting a work piece, and a bottom portion;

e. means, formed in the bottom portion of the first platform, for engaging each of said guide rails, whereby each guide rail orients said first platform in a different position with respect to the abrasive wheel, and said first platform is slidable along said guide rail and track surfaces;

f. a second platform having a top portion for supporting a work piece and a bottom portion; and, g. means, formed in the bottom portion of the second platform, for detachably securing the second platform to the top portion of the first platform;

h. a vice means, detachably securable to the first platform or second platform, for securing the work piece to said platforms; and, i. means, attached to the vice means and first platform or second platform, for sliding said vice means in a direction perpendicular to the longitudinal axis of the cutting unit and parallel to the abrasive wheel.

2. A cutting apparatus, as defined in claim 1, wherein said second platform includes a horizontally disposed support surface for supporting a work piece and means for selectively adjusting said support surface of the second platform at an angle with respect to the abrasive wheel.

3. A cutting apparatus, as defined in claim 2, wherein said second platform includes a lower pocket portion depending from the top portion of said second platform and said first platform top portion fitting within the lower pocket portion of the second platform, and said selective height adjustment means of the second platform includes a vertically disposed bolt extending through the top portion of the second platform and contacting the support surface of the first platform.

4. A cutting apparatus, as defined in claim 3, wherein said cutting apparatus further includes means for selectively adjusting the height of the abrasive wheel.

5. A cutting apparatus, as defined in claim 4, wherein said abrasive wheel adjustment means includes a mounting plate hingedly mounted to the planar member and the cutting unit is mounted to the mounting plate, and a bolt is connected to the mounting plate and planar member, and said mounting plate is elevated upon adjustment of the bolt.

6. A cutting apparatus with an abrasive wheel, for cutting a work piece, comprising:

a) a planar member having a top surface, a first edge and a second edge;

b) a cutting unit mounted to the top surface of said planar member with said cutting unit having a motor unit and an abrasive wheel, said abrasive wheel having a cutting edge extending in a plane perpendicular to a longitudinal axis of the cutting unit, said abrasive wheel having a first wheel surface facing the motor unit and a second wheel surface facing the second edge of the planar member;

c) a plurality of guide rails mounted to the top surface of the planar member between the abrasive wheel and the second edge of the planar member, and extending upward therefrom, said guide rails aligned in a parallel relationship to the cutting edge of the abrasive wheel and forming a plurality of track surfaces on the planar member;

d) a first platform having a top portion and a bottom portion, said top portion having a horizontally disposed support surface for supporting the work piece;

e) means, formed in the bottom portion of the first platform, for engaging each of said guide rails, whereby each guide rail orients said first platform in a different position with respect to the abrasive wheel, and said first platform is slidable on said guide rail and said track surfaces;

f) wherein said plurality of guide rails includes a first guide rail mounted on the top surface of the planar member adjacent the abrasive wheel, a second guide rail mounted to the top surface of the planar member and spaced apart from said first guide rail, and a third guide rail mounted to the top surface of the planar member and spaced apart from said second guide rail, with said second guide rail intermediate said first guide rail and said third guide rail; and g) wherein said cutting apparatus further includes a stop mounted on the top surface of the planar member intermediate the first guide rail and the second guide rail.

7. A cutting apparatus with an abrasive wheel, for cutting a work piece, comprising:

a) a planar member having a top surface, a first edge and a second edge;

b) a cutting unit mounted to the top surface of said planar member with said cutting unit having a motor unit and an abrasive wheel, said abrasive wheel having a cutting edge extending in a plane perpendicular to a longitudinal axis of the cutting unit, said abrasive wheel having a first wheel surface facing the motor unit and a second wheel surface facing the second edge of the planar member;

c) a plurality of guide rails mounted to the top surface of the planar member between the abrasive wheel and the second edge of the planar member, and extending upward therefrom, said guide rails aligned in a parallel relationship to the cutting edge of the abrasive wheel and forming a plurality of track surfaces on the planar member;

d) a first platform having a top portion and a bottom portion, said top portion having a horizontally disposed support surface for supporting the work piece;

e) means, formed in the bottom portion of the first platform, for engaging each of said guide rails, whereby each guide rail orients said first platform in a different position with respect to the abrasive wheel, and said first platform is slidable on said guide rail and said track surfaces;

f) wherein said cutting apparatus further includes means for adjusting the height of a work piece to be cut with respect to the abrasive wheel;

g) wherein said height adjustment means includes a second platform detachably mountable on said first platform;

h) wherein said second platform includes a top portion having a horizontally disposed support surface and means for selectively adjusting said support surface of the second platform to an angle above horizontal; and i) wherein said second platform includes a lower pocket portion depending from the top portion of the second platform and said first platform top portion fitting within the lower pocket portion of the second platform, and said selective height adjustment means includes a vertically disposed bolt extending through the top portion of the second platform and in contact with the support surface of the first platform.

8. A cutting apparatus for cutting a metal object comprising:

a) a planar member having a top surface, a first edge and a second edge;

b) a cutting unit mounted to the top surface of the planar member with said cutting unit having an abrasive wheel, activated by a motor, said abrasive wheel having a cutting edge extending in a plane perpendicular to a longitudinal axis of the cutting unit, and said abrasive wheel having a first wheel surface facing the motor unit and a second wheel surface facing the second edge of the planar member;

c) a plurality of guide rails mounted to the top surface of the planar member between said abrasive wheel and the second edge of the cutting unit, and spaced apart forming a plurality of track surfaces on the planar member, and said guide rails aligned in parallel relationship to the cutting edge of the abrasive wheel;

d) a first platform having a top portion and a horizontally disposed support surface integral the top portion for supporting a work piece, and a bottom portion;

e) means, formed in the bottom portion of the first platform, for engaging the track surface and said guide rails, whereby each guide rail orients said first platform in a different position with respect to the abrasive wheel, and said first platform is slidable along said guide rail and track surfaces parallel to the cutting edge of the abrasive wheel;

f) a second platform having a top portion for supporting a work piece and a bottom portion;

g) means, formed in the bottom portion of the second platform, for detachably securing the second platform to the top portion of the first platform;

h) wherein said second platform includes a horizontally disposed support surface supporting a work piece and means for selectively adjusting said support surface of the second platform with respect to the abrasive wheel; and i) wherein said second platform includes a lower pocket portion depending from the top portion of said second platform and said first platform top portion fits within the lower pocket portion of the second platform, and said selective height adjustment means includes a vertically disposed bolt extending through the top portion of the second platform and contacts the support surface of the first platform.

9. A cutting apparatus with an abrasive wheel, for cutting a work piece, comprising:

a) a planar member having a top surface, a first edge and a second edge;

b) a cutting unit mounted to the top surface of said planar member with said cutting unit having a motor unit and an abrasive wheel, said abrasive wheel having a cutting edge extending in a plane perpendicular to a longitudinal axis of the cutting unit, said abrasive wheel having a first wheel surface facing the motor unit and a second wheel surface facing the second edge of the planar member;

c) a plurality of guide rails mounted to the top surface of the planar member between the abrasive wheel and the second edge of the planar member, and extending upward therefrom, said guide rails aligned in a parallel relationship to the cutting edge of the abrasive wheel and forming a plurality of track surfaces on the planar member;

d) a first platform having a top portion and a bottom portion, said top portion having a horizontally disposed support surface for supporting the work piece;

e) means, formed in the bottom portion of the first platform, for engaging each of said guide rails, whereby each guide rail orients said first platform in a different position with respect to the abrasive wheel, and said first platform is slidable on said guide rail and said track surfaces;

f) wherein said cutting apparatus further includes means for selectively adjusting the height of the abrasive wheel; and g) wherein said abrasive wheel adjustment means includes a mounting plate hingedly mounted to the planar member and the cutting unit mounted to the mounting plate, and a bolt connected to the mounting plate and planar member, and said mounting plate is elevated from the planar member upon adjustment of the bolt.

10. A cutting apparatus with an abrasive wheel, for cutting a work piece, comprising:

a) a planar member having a top surface, a first edge and a second edge;

b) a cutting unit mounted to the top surface of said planar member with said cutting unit having a motor unit and an abrasive wheel, said abrasive wheel having a cutting edge extending in a plane perpendicular to a longitudinal axis of the cutting unit, said abrasive wheel having a first wheel surface facing the motor unit and a second wheel surface facing the second edge of the planar member;

c) a plurality of guide rails mounted to the top surface of the planar member between the abrasive wheel and the second edge of the planar member, and extending upward therefrom, said guide rails aligned in a parallel relationship to the cutting edge of the abrasive wheel and forming a plurality of track surfaces on the planar member;

d) a first platform having a top portion and a bottom portion, said top portion having a horizontally disposed support surface for supporting the work piece;

e) means, formed in the bottom portion of the first platform, for engaging each of said guide rails, whereby each guide rail orients said first platform in a different position with respect to the abrasive wheel, and said first platform is slidable on said guide rail and said track surfaces; and f) further including a vice means attached to the top portion of the first platform and means, attached to said vice means and said first platform, for selectively sliding the vice means on the first platform in a direction perpendicular to the longitudinal axis of the cutting unit and in a direction parallel the abrasive wheel.

11. A cutting apparatus for cutting a metal object comprising:

a) a planar member having a top surface, a first edge and a second edge;

b) a cutting unit mounted to the top surface of the planar member with said cutting unit having an abrasive wheel, activated by a motor, said abrasive wheel having a cutting edge extending in a plane perpendicular to a longitudinal axis of the cutting unit, and said abrasive wheel having a first wheel surface facing the motor unit and a second wheel surface facing the second edge of the planar member;

c) a plurality of guide rails mounted to the top surface of the planar member between said abrasive wheel and the second edge of the cutting unit, and spaced apart forming a plurality of track surfaces on the planar member, and said guide rails aligned in parallel relationship to the cutting edge of the abrasive wheel;

d) a first platform having a top portion and a horizontally disposed support surface integral the top portion for supporting a work piece, and a bottom portion;

e) means, formed in the bottom portion of the first platform, for engaging the track surface and said guide rails, whereby each guide rail orients said first platform in a different position with respect to the abrasive wheel, and said first platform is slidable along said guide rail and track surfaces parallel to the cutting edge of the abrasive wheel;

f) a second platform having a top portion for supporting a work piece and a bottom portion;

g) means, formed in the bottom portion of the second platform, for detachably securing the second platform to the top portion of the first platform;

h) wherein said cutting apparatus further includes means for selectively adjusting the height of the abrasive wheel; and i) wherein said abrasive wheel adjustment means includes a mounting plate hingedly mounted to the planar member and said cutting unit is mounted to the mounting plate, and a bolt is connected to the mounting plate and planar member, and said mounting plate is elevated upon adjustment of the bolt.

12. A cutting apparatus for cutting a metal object comprising:

a) a planar member having a top surface, a first edge and a second edge;

b) a cutting unit mounted to the top surface of the planar member with said cutting unit having an abrasive wheel, activated by a motor, said abrasive wheel having a cutting edge extending in a plane perpendicular to a longitudinal axis of the cutting unit, and said abrasive wheel having a first wheel surface facing the motor unit and a second wheel surface facing the second edge of the planar member;

c) a plurality of guide rails mounted to the top surface of the planar member between said abrasive wheel and the second edge of the cutting unit, and spaced apart forming a plurality of track surfaces on the planar member, and said guide rails aligned in parallel relationship to the cutting edge of the abrasive wheel;

d) a first platform having a top portion and a horizontally disposed support surface integral the top portion for supporting a work piece, and a bottom portion;

e) means, formed in the bottom portion of the first platform, for engaging the track surface and said guide rails, whereby each guide rail orients said first platform in a different position with respect to the abrasive wheel, and said first platform is slidable along said guide rail and track surfaces parallel to the cutting edge of the abrasive wheel;

f) a second platform having a top portion for supporting a work piece and a bottom portion;

g) means, formed in the bottom portion of the second platform, for detachably securing the second platform to the top portion of the first platform; and h) further including a vice means attached to the top portion of the first platform or second platform and means, attached to said vice means and said first platform, for selectively sliding the vice means on the first platform in a direction perpendicular to the longitudinal axis of the cutting unit and in a direction parallel the abrasive wheel.

13. A cutting apparatus for cutting a metal object comprising:

a) a planar member having a top surface, a first edge and a second edge;

b) a cutting unit mounted to the top surface of the planar member with said cutting unit having an abrasive wheel, activated by a motor, said abrasive wheel having a cutting edge extending in a plane perpendicular to a longitudinal axis of the cutting unit, and said abrasive wheel having a first wheel surface facing the motor unit and a second wheel surface facing the second edge of the planar member;

c) a plurality of guide rails mounted to the top surface of the planar member between said abrasive wheel and the second edge of the cutting unit, and spaced apart forming a plurality of track surfaces on the planar member, and said guide rails aligned in parallel relationship to the cutting edge of the abrasive wheel;

d) a first platform having a top portion and a horizontally disposed support surface integral the top portion for supporting a work piece, and a bottom portion;

e) means, formed in the bottom portion of the first platform, for engaging the track surface and said guide rails, whereby each guide rail orients said first platform in a different position with respect to the abrasive wheel, and said first platform is slidable along said guide rail and track surfaces parallel to the cutting edge of the abrasive wheel;

f) a second platform having a top portion for supporting a work piece and a bottom portion;

g) means, formed in the bottom portion of the second platform, for detachably securing the second platform to the top portion of the first platform;

h) wherein said plurality of guide rails includes a first guide rail mounted to the planar member adjacent the abrasive wheel, a second guide rail mounted to the planar member between the first guide rail and the second edge of the planar member and a third guide rail mounted to the planar member spaced apart from the second guide rail, and the second guide rail is mounted intermediate the first guide rail and the third guide rail; and i) further including a stop mounted to the planar member between the first guide rail and second guide rail.

* * * * *